United States Patent [19]
Tsuchiya

[11] Patent Number: 5,187,350
[45] Date of Patent: Feb. 16, 1993

[54] VEHICLE WINDSHIELD HEATER UTILIZING REGULATOR OUTPUT CURRENT CONTROL WITH A VOLTAGE DIVIDER

[75] Inventor: Yoshinobu Tsuchiya, Fujisawa, Japan

[73] Assignee: Isuzu Motors Limited, Tokyo, Japan

[21] Appl. No.: 877,381

[22] Filed: Apr. 29, 1992

Related U.S. Application Data

[63] Continuation of Ser. No. 696,256, Apr. 30, 1991, abandoned, which is a continuation of Ser. No. 530,293, May 30, 1990, abandoned.

[30] Foreign Application Priority Data

Jun. 6, 1989 [JP] Japan .................. 1-143481

[51] Int. Cl.$^5$ ............................................ B60S 1/02
[52] U.S. Cl. ............................................... 219/203
[58] Field of Search ............. 219/203, 202, 547, 522; 237/12.3 R; 307/10.7

[56] References Cited

U.S. PATENT DOCUMENTS

| | | | |
|---|---|---|---|
| 3,639,938 | 2/1972 | Golden | 219/203 |
| 4,084,126 | 4/1978 | Clements | 219/202 |
| 4,267,433 | 5/1981 | Sahm, III | 219/203 |
| 4,673,797 | 6/1987 | Weirick | 219/203 |
| 4,780,619 | 10/1988 | Campbell et al. | 307/10 R |
| 4,862,055 | 8/1989 | Maruyama et al. | 219/203 |
| 4,884,018 | 11/1989 | Meuret et al. | 219/203 |
| 4,985,671 | 1/1991 | Sauer | 219/203 |
| 5,025,136 | 6/1991 | Doege et al. | 219/203 |

*Primary Examiner*—Geoffrey S. Evans
*Assistant Examiner*—John A. Jeffery
*Attorney, Agent, or Firm*—Staas & Halsey

[57] ABSTRACT

An ice melting system for a motor vehicle supplies a heater incorporated in a windshield with electric energy which is generated by a generator that is drivable by an engine on the motor vehicle. A voltage which is obtained by dividing an output voltage from the generator is applied as a control input voltage to a voltage regulator which controls the output voltage of the generator. When the voltage regulator is supplied with a control input voltage which is lower than when a battery on the motor vehicle is charged, the voltage regulator increases a current supplied to a field coil of the generator, thus enabling the generator to increase the output voltage thereof. Therefore, the heater is supplied with a larger amount of electric energy to melt ice on the windshield efficiently.

4 Claims, 2 Drawing Sheets

VEHICLE WINDSHIELD HEATER UTILIZING REGULATOR OUTPUT CURRENT CONTROL WITH A VOLTAGE DIVIDER

This application is a continuation of application Ser. No. 07/696,256, filed Apr. 30, 1991, now abandoned, which is itself a continuation of Ser. No. 07/530,293, now abandoned filed May 30, 1990.

BACKGROUND OF THE INVENTION

The present invention relates to an ice melting system for thawing ice applied to a motor vehicle windshield such as a front windshield.

One proposed ice melting system for thawing ice applied to the front windshield of a motor vehicle in cold climate comprises an electric heater in the form of a thin film of silver oxide which is deposited on the front windshield by sputtering. When the electric heater is energized by electric energy supplied thereto, it is heated to increase the temperature of the glass of the front windshield, thereby thawing the ice.

The electric heater of the type described has a high electric resistance, and requires a large amount of electric energy to thaw the ice on the front windshield. The ice melting system needs to incorporate a large-capacity power supply which can supply a large amount of electric power ranging from 1.5 to 2 KW at a voltage from 60 to 70 V, for example.

There have been proposed ice melting apparatus in which an alternator for charging a battery on a motor vehicle is used as a power supply and the electric energy generated by the alternator is supplied to an electric heater to melt the ice on a windshield. Such proposed ice melting apparatus are disclosed in Japanese Patent Publication No. 61(1986)-33735 (corresponding to U.S. Pat. No. 4,084,126) and Japanese Laid-Open Patent Publication No. 63(1988)-69500 (corresponding to U.S. Pat. No. 4,780,619), for example.

The proposed arrangement disclosed in the former publication comprises a windshield heater circuit which is composed of a generator drivable by an engine on a motor vehicle, a windshield having an electric-resistance heater element, and a battery on the motor vehicle. The windshield heater circuit further includes a first switch for connecting the heater element to the generator, and a second switch that can be shifted between a first condition in which the output of the generator is connected to the battery and a voltage regulator for the generator and a second condition in which the voltage regulator is connected to the battery. In a thawing mode of operation, the first switch is closed to connect the heater element to the generator, and the second switch is shifted into the second condition, so that the voltage regulator is supplied with only the voltage from the battery.

In the thawing mode, as described above, only the battery voltage is applied to the voltage regulator, and the output voltage of the generator is controlled depending on the battery voltage. However, it is difficult to control the generator output voltage so as to be appropriate for melting the ice. It is desirable to obtain a certain voltage suitable for ice melting without resorting to feedback control. To meet this demand, the rotational speed of the engine which drives the generator, the capacity of the generator, and the load on the heater element have to be preset to strict values. Since these factors or parameters vary from device to device, it is highly difficult to obtain an amount of electric energy which is suitable for ice melting without a feedback control loop.

The latter publication shows a windshield heater circuit in which the AC output from a generator is boosted by a three-phase transformer to a higher voltage which is rectified into a DC voltage that is applied to a heater element mounted on a front windshield. Since the transformer is employed to boost the AC output from the generator, however, the disclosed windshield heater circuit is heavy and expensive. Use of the rectifier which rectifies the higher AC voltage into the DC voltage causes an electric power loss.

SUMMARY OF THE INVENTION

It is an object of the present invention to provide an ice melting system for efficiently melting ice on a motor vehicle windshield through suitable control of the output of a generator which serves as a power supply for a heater on the windshield.

Another object of the present invention is to provide an ice melting system for a motor vehicle, which can increase a driving force for a generator thereby to obtain a sufficient output from the generator when a heater on a motor vehicle windshield is energized.

Still another object of the present invention is to provide an ice melting system for a motor vehicle, which includes means for scraping off any remaining ice from a windshield when the ice applied to the windshield has been thawed to a certain extent, so that the ice on the windshield can be removed in a short period of time.

According to the present invention, there is provided an ice melting system in a motor vehicle having an engine, a generator drivable by the engine, a voltage regulator for controlling the generator, a windshield having a heater, and a battery, the ice melting system comprising a first switch disposed in a circuit interconnecting the generator and the heater, a rectifier for rectifying AC electric energy generated by the generator into DC electric energy, a second switch disposed in a circuit interconnecting the rectifier and the battery, voltage dividing means for dividing a voltage produced by the rectifier at a predetermined ratio, a third switch shiftable between a first condition in which the voltage regulator is connected to the circuit interconnecting the rectifier and the battery, and a second condition in which the voltage dividing means is connected to the voltage regulator when the heater operates, operation command means for giving an operation command to command operation of the heater, and a control circuit for closing the first switch, opening the second switch and shifting the third switch to the second condition when the operation command means commands operation of the heater.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
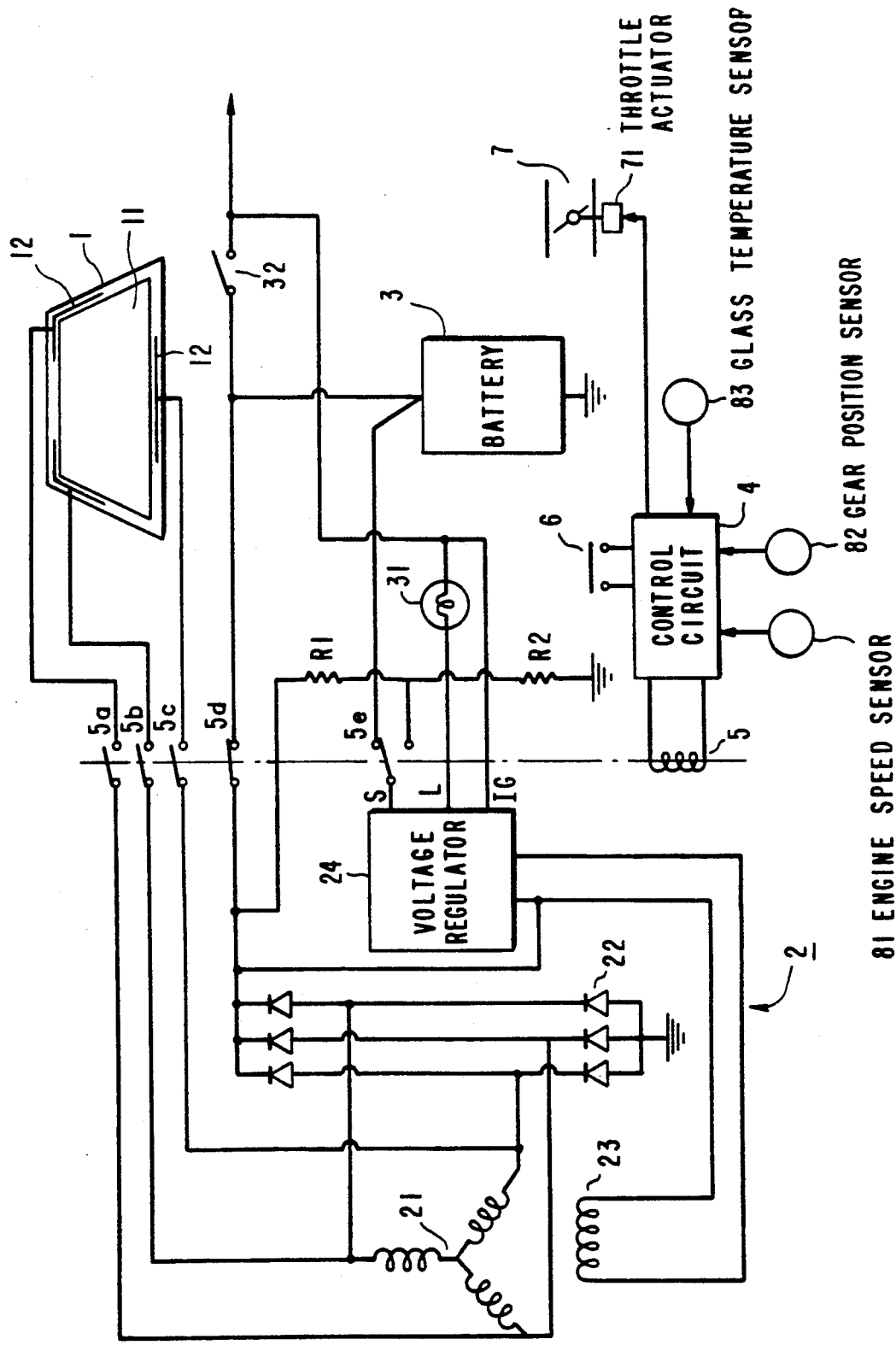
FIG. 1 is a circuit diagram of an ice melting system for a motor vehicle according to an embodiment of the present invention.

FIG. 1 shows an ice melting system for a motor vehicle according to an embodiment of the present invention.

A front windshield 1 of a motor vehicle comprises a laminated sheet of glass including, as intermediate layers, a transparent electrically conductive film 11 formed by sputtering and serving as an ice melting heater, and intermediate adhesive films. Three leads 12, for example, are connected to the transparent electrically conductive film 11. When the temperature of ambient air is −9° C. and a layer of ice applied to the outer surface of the front windshield shield 1 has a thickness of about 1 mm, electric energy of about 1.5 KW/m$^2$ is supplied through the leads 12 to the transparent electrically conductive film 11 to thaw the ice in about 4 minutes. If the electric energy is supplied at a voltage ranging from 60 to 70 V, then a current in the range of from 20 to 25 A is required to be supplied to the leads 12.

A generator 2 drivable by the engine of the motor vehicle is known as an alternator, and comprises a stator coil 21 for inducing a generated output, a diode bridge 22 for rectifying the generated output, a field coil 23 for controlling a generated output voltage, and a voltage regulator 24 for controlling a current to be supplied to the field coil 23. The voltage regulator 24 has a detecting terminal S for detecting the voltage of a battery 3, etc., a lamp terminal L connected to a charge lamp 31, and an ignition terminal IG connected to the ignition circuit of the engine.

Figure 2:
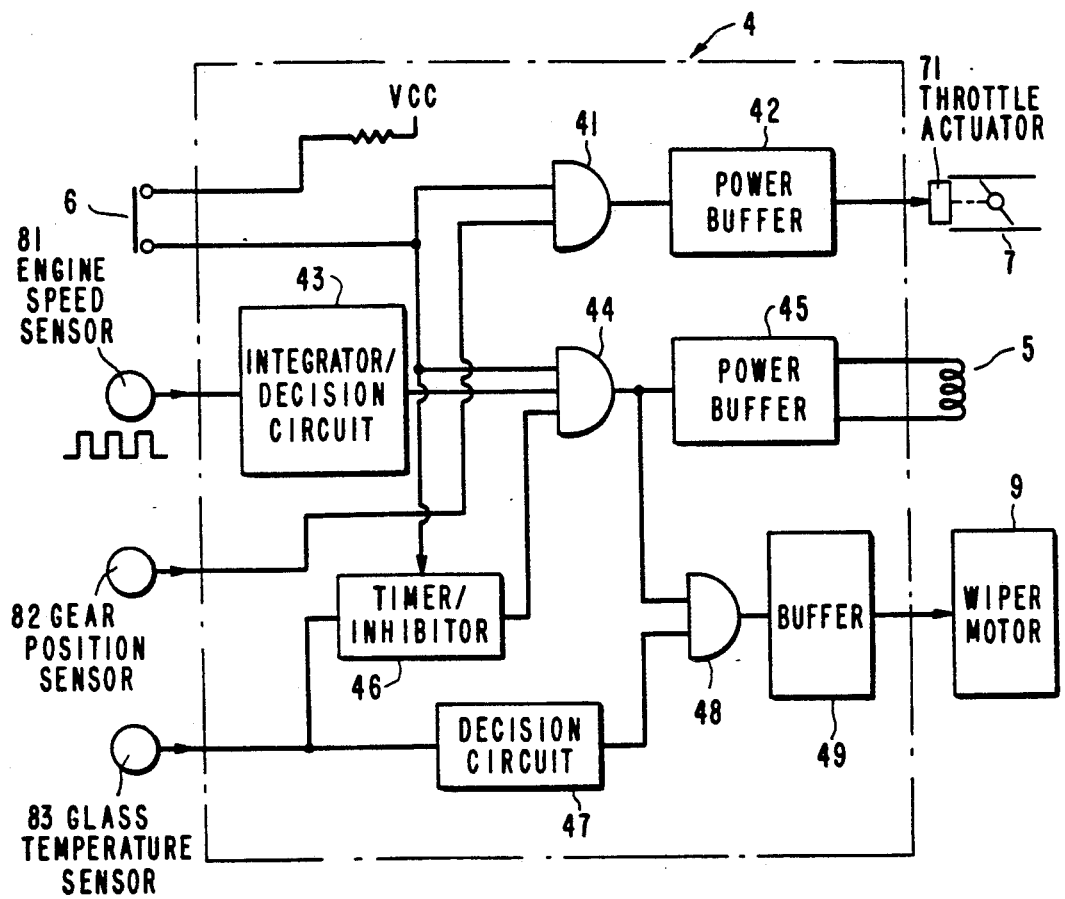
FIG. 2 is a block diagram of a control circuit in the ice melting system.

A control circuit 4, which is shown in greater detail in FIG. 2, is supplied with various signals to control the rotational speed of the engine and energize a relay 5 to control various switch contacts when the ice on the windshield 1 is to be thawed.

The stator coil 21 of the generator 2 and the leads 12 of the conductive film 11 are connected to each other by normally open contacts 5a, 5b, 5c. The rectified output from the stator coil 21 is supplied to the battery 3 through a normally closed contact 5d. The detecting terminal S of the voltage regulator 24 is selectively connected through a contact 5e to a positive terminal of the battery 3 or a voltage divider which divides the rectified output voltage from the generator 2 at a certain dividing ratio. These contacts 5a through 5e are shiftable under the control of the relay 5.

The voltage divider comprises two resistors R1, R2 between which the contact 5e is connected. The voltage divider serves as a voltage measuring means, and the resistors R1, R2 have respective resistances which are related to each other as follows:

$$Vs = \frac{R2}{R1 + R2} Vo$$

where Vs is a voltage applied to the detecting terminal S of the voltage regulator 24 when the generated output is supplied from the generator 2 to the battery 3, and Vo is a voltage applied to the transparent electrically conductive film 11 when the ice applied to the windshield 1 is thawed. When the contact 5e is shifted downwardly into contact with a lower contact in response to energization of the relay 5, a lower divided voltage is applied to the detecting terminal S by the voltage divider. Now, the voltage regulator 24 increases the current supplied to the field coil 23 thereby causing the generator 2 to produce a higher voltage.

An ice melting switch 6, serving as an operation command switch, which is connected to the control circuit 4 is manually turned on or closed when the ice deposited on the windshield 1 is to be thawed. The engine has a throttle valve 7 which is actuated by a throttle actuator 71 to control the operation of the engine, the throttle actuator 71 being controlled by the control circuit 4. The control circuit 4 is supplied with a detected signal from an engine speed sensor 81 which detects the rotational speed of the engine and a detected signal from a gear position sensor 82 which detects a neutral gear position of a transmission associated with the engine. The temperature of the front windshield 1 which incorporates the transparent electrically conductive film 11 is detected by a glass temperature sensor 83 which supplies a detected signal to the control circuit 4.

The control circuit 4 will now be described with reference to FIG. 2. Those parts shown in FIG. 2 which are identical to those shown in FIG. 1 are denoted by identical reference numerals.

As shown in FIG. 2, the ice melting switch 6 is connected to AND gates 41, 44, and applies a trigger signal to a timer/inhibitor 46 when the ice melting switch 6 is turned on.

The detected signal from the engine speed sensor 81 is applied to an integrator/decision circuit 43 which determines whether a pulsed rotational speed signal is integrated and has reached a predetermined rotational speed or not. The output of the integrator/decision circuit 43 is applied to the AND gate 44.

The detected signal from the gear position sensor 82 is applied to the AND gate 41. If the ice melting switch 6 is turned on and the transmission is in the neutral gear position, then the output of the AND gate 41 is applied through a power buffer 42 to the throttle actuator 71 which then opens the throttle valve 7 to a predetermined degree.

The detected signal from the glass temperature sensor 83 is applied through the timer/inhibitor 46 to the AND gate 44, and also applied through a temperature decision circuit 47 to an AND gate 48. As long as the ice melting switch 6 is turned on, the engine rotational speed has reached a predetermined speed, and the timer/inhibitor 46 is enabled for a preset interval of time to pass the temperature signal after it has been triggered, the AND gate 44 applies an output signal to a power buffer 45 which energizes the relay 5, thus operating the switch contacts 5a through 5e. When the signal from the glass temperature sensor 83 represents a temperature higher than a predetermined temperature, the timer/inhibitor 46 does not apply its output signal to the AND gate 44. Therefore, any continued operation of the ice melting system is inhibited after the ice has been thawed.

The decision circuit 47 determines whether the ice on the windshield 1 is thawed or not, based on the signal from the glass temperature sensor 83, and applies its output signal to the AND gate 48. If the output signal from the AND gate 44 and the output signal from the decision circuit 47 are applied as input signals to the AND gate 48, then the AND gate 48 applies its output signal to a buffer 49, enabling it to energize a wiper motor 9 to operate the windshield wiper on the front windshield 1 which has reached the ice melting temperature. When the windshield wiper is thus operated, it quickly scrapes off any remaining ice which is being thawed.

Operation of the ice melting system thus constructed will be described below.

When the ice melting switch 6 is turned on, the signal from the gear position sensor 82 connected to the control circuit 4 is checked. If the gear position is the neutral gear position, then the throttle actuator 71 is operated by the output signal from the AND gate 41. The throttle valve is opened to increase the rotational speed of the engine.

When the rotational speed of the engine increases to a predetermined speed, the signal from the engine speed sensor 81, the signal from the ice melting switch 6, and the signal from the timer/inhibitor 46 which has been triggered are applied to enable the AND gate 44 to actuate the relay 5, thereby operating the switch contacts 5a through 5e.

The electric energy which has been supplied so far from the generator 2 to the battery 3 is turned off, and AC electric energy is supplied from the stator coil 21 through the leads 12 to the transparent electrically conductive film 11. At the same time, a voltage which is produced by dividing the rectified output voltage from the generator 2 with the voltage divider is applied to the detecting circuit S of the voltage regulator 24. In response to application of the divided voltage, the voltage regulator 24 increases the current supplied to the field coil 23. Accordingly, a higher voltage is induced across the stator coil 21, so that the electric energy supplied to the transparent electrically conductive film 11 is increased, thus melting the ice on the front windshield 1 at an accelerated rate with the electrically generated heat energy.

During the interval of time which has been set by the timer/inhibitor 46, the transparent electrically conductive film 11 is continuously energized to increase its temperature. When the temperature indicated by the signal from the glass temperature sensor 83 reaches a predetermined ice melting temperature, the decision circuit 47 is enabled to cause the AND gate 48 and the buffer 49 to energize the wiper motor 9. The windshield wiper now scrapes off the ice which is being thawed o the windshield 1.

When the time preset by the timer/inhibitor 46 elapses, the AND gate 44 is turned off, and the relay 5 is de-energized thereby returning the contacts 5a through 5e back to their normal positions. The battery 3 is now charged by the generator 2.

When the ice has been completely thawed before the elapse of the time set by the timer/inhibitor 46, the ice melting switch 6 may be turned off to de-energize the transparent electrically conductive film 11 and inactivate the windshield wiper.

With the above embodiment, as described above, the voltage obtained by dividing the output voltage from the rectifier at a predetermined dividing ratio is applied as a control input to the voltage regulator for the alternator on the motor vehicle, so that the voltage regulator operates to increase the current supplied to the field coil of the alternator. The alternator then produces a higher voltage which is supplied to the electric heater of the windshield. Therefore, the ice on the windshield can quickly be removed by the large amount of electric energy supplied from the alternator to the electric heater.

The three leads connected to the transparent electrically conductive film which serve as the electric heater are supplied with an three-phase AC output from the alternator, i.e., the generator. Therefore, there is no neutral terminal on the transparent electrically conductive film. Since there are no separate insulated regions in the transparent electrically conductive film, the transparent electrically conductive film generates heat uniformly throughout its area without localized heat radiations. Application of the AC electric energy to the transparent electrically conductive film heats the film in a pulsating manner, so that the ice on the windshield can efficiently be thawed without any electric power loss which would otherwise be caused by a rectifier. Consequently, the ice melting system can melt the ice on the windshield efficiently.

Furthermore, the control circuit which operates the relay checks the rotational speed of the engine, the gear position of the transmission, and the temperature of the front windshield, and opens the throttle valve and actuates the wiper motor depending on the checked parameters. Accordingly, the ice on the front windshield can be thawed efficiently in a short period of time.

Although a certain preferred embodiment has been shown and described, it should be understood that many changes and modifications may be made therein without departing from the scope of the appended claims.

What is claimed is:

1. An ice melting system in a motor vehicle having an engine, a generator drivable by the engine, a voltage regulator for controlling the generator, a windshield having a heater, and a battery, said ice melting system comprising:
   a first switch disposed in a circuit interconnecting the generator and the heater so that AC electric energy generated by the generator is supplied to the heater when said first switch is closed;
   a rectifier for rectifying AC electric energy generated by the generator into DC electric energy;
   a second switch disposed in a circuit interconnecting the rectifier and the battery;
   voltage dividing means for dividing a voltage produced by said rectifier at a predetermined ratio;
   a third switch shiftable between a first condition in which the voltage regulator is connected to said circuit interconnecting the rectifier and the battery, and a second condition in which said voltage dividing means is connected to the voltage regulator when the heater operates;
   operation command means for giving an operation command to command operation of the heater; and
   a control circuit for closing said first switch, opening said second switch, and shifting said third switch to said second condition when said operation command means commands operation of the heater.

2. An ice melting system according to claim 1, further comprising control means for controlling the rotational speed of the engine, said control circuit having means for operating said control means to increase the rotational speed of the engine in response to an operation command from said operation command means.

3. An ice melting system according to claim 1, further comprising temperature detecting means for detecting the temperature of the windshield, and a wiper for wiping the windshield, said control circuit having means for operating said wiper when a signal from said temperature detecting means reaches a predetermined level.

4. An ice melting system in a motor vehicle having an engine, a generator drivable by the engine, a voltage regulator for controlling the generator, a windshield having a heater, and a battery, said ice melting system comprising:
- a first switch disposed in a circuit interconnecting the generator and the heater;
- a rectifier for rectifying AC electric energy generated by the generator into DC electric energy;
- a second switch disposed in a circuit interconnecting the rectifier and the battery;
- voltage dividing means for dividing a voltage produced by said rectifier at a predetermined ratio so as to provide a divided voltage at a terminal of said voltage dividing means;
- a third switch shiftable between a first condition in which the voltage regulator is connected to said circuit interconnecting the rectifier and the battery, and a second condition in which said terminal of said voltage dividing means is connected to the voltage regulator when the heater operates;
- operation command means for giving an operation command to command operation of the heater; and
- a control circuit for closing said first switch, opening said second switch, and shifting said third switch to said second condition when said operation command means commands operation of the heater.

* * * * *